(12) United States Patent
Rohleder et al.

(10) Patent No.: US 11,314,686 B2
(45) Date of Patent: Apr. 26, 2022

(54) HARDWARE FOR SUPPORTING TIME TRIGGERED LOAD ANTICIPATION IN THE CONTEXT OF A REAL TIME OS

(71) Applicant: NXP USA, Inc., Austin, TX (US)

(72) Inventors: Michael Rohleder, Unterschleissheim (DE); George Adrian Ciusleanu, Marasesti (RO); David Allen Brown, Austin, TX (US); Jeffrey Freeman, Austin, TX (US)

(73) Assignee: NXP USA, Inc., Austin, TX (US)

( * ) Notice: Subject to any disclaimer, the term of this patent is extended or adjusted under 35 U.S.C. 154(b) by 115 days.

(21) Appl. No.: 16/412,746

(22) Filed: May 15, 2019

(65) Prior Publication Data

US 2020/0272594 A1 Aug. 27, 2020

(30) Foreign Application Priority Data

Feb. 26, 2019 (RO) .............................. A201900131

(51) Int. Cl.
*G06F 15/78* (2006.01)

(52) U.S. Cl.
CPC ........ *G06F 15/781* (2013.01); *G06F 15/7814* (2013.01)

(58) Field of Classification Search
CPC .. G06F 15/781; G06F 15/7814; G06F 9/4881; G06F 9/4843; G06F 9/3802;

(Continued)

(56) References Cited

U.S. PATENT DOCUMENTS

| | | | | |
|---|---|---|---|---|
| 6,338,125 B1 * | 1/2002 | Kopser | ............... | G06F 13/1605 710/112 |
| 6,453,434 B2 * | 9/2002 | Delp | ................... | G06F 13/1694 714/718 |

(Continued)

FOREIGN PATENT DOCUMENTS

CN 106126332 A 11/2016

OTHER PUBLICATIONS

Chengqiang Zhang and Sally A. McKee. Hardware-only stream prefetching and dynamic access ordering. In Proceedings of the 14th international conference on Supercomputing (ICS '00). Association for Computing Machinery, New York, NY, USA, 167-175. (Year: 2000).*

(Continued)

*Primary Examiner* — Jyoti Mehta
*Assistant Examiner* — Kasim Alli

(57) ABSTRACT

An integrated circuit is disclosed that includes a central processing unit (CPU), a random access memory (RAM) configured for storing data and CPU executable instructions, a first peripheral circuit for accessing memory that is external to the integrated circuit, a second peripheral circuit, and a communication bus coupled to the CPU, the RAM, the first peripheral circuit and the second peripheral circuit. The second peripheral circuit includes a first preload register configured to receive and store a first preload value, a first register configured to store first information that directly or indirectly identifies a first location where first instructions of a first task can be found in memory that is external to the integrated circuit, and a counter circuit that includes a counter value. The counter circuit can increment or decrement the counter value with time when the counter circuit is started. A first compare circuit is also included and can compare the counter value to the first preload value. The first compare circuit is configured to assert a first match signal in (Continued)

response to detecting a match between the counter value and the first preload value. The second peripheral circuit is configured to send a first preload request to the first peripheral circuit in response to an assertion of the first match signal. The first preload request identifies the location where the first instructions of the first task can be found in the external memory.

20 Claims, 5 Drawing Sheets

(58) Field of Classification Search
CPC ........ G06F 9/48; G06F 9/4806; G06F 9/4812; G06F 9/461; G06F 12/0862
See application file for complete search history.

(56) References Cited

U.S. PATENT DOCUMENTS

| | | | |
|---|---|---|---|
| 8,209,694 B2 | 6/2012 | Glistvain | |
| 9,009,714 B2 | 4/2015 | Lee et al. | |
| 9,342,350 B2* | 5/2016 | Maruyama | G06F 9/30145 |
| 2009/0049256 A1* | 2/2009 | Hughes | G06F 13/1626 |
| | | | 711/158 |
| 2009/0063790 A1* | 3/2009 | Im | G06F 12/0646 |
| | | | 711/154 |
| 2012/0072668 A1* | 3/2012 | Chirca | G06F 12/0862 |
| | | | 711/122 |
| 2018/0011735 A1 | 1/2018 | Singer et al. | |
| 2018/0011736 A1* | 1/2018 | Rohleder | G06F 9/3802 |
| 2018/0165204 A1* | 6/2018 | Venkatesh | G06F 9/30047 |

OTHER PUBLICATIONS

Fohler, Gerhard; "Time Triggered and Event Triggered; Off-line Scheduling"; Real-Time Architectures—TUe, Malardalen University; Sweden; © Gerhard Fohler 2004; 43 pages.

Hofer, Wanja et al.; "Sloth on Time: Efficient Hardware-Based Scheduling for Time Triggered RTOS"; Proceedings of the 33$^{rd}$ IEEE Real-Time Symposium (RTS '12); IEEE Computer Society; 2012, pp. 237-247.

Septinus, K. et al.; "A Scalable Hardware Algorithm for Demanding Time Management in Network Systems"; Institute of Microelectronic Systems; Appelstr. 4, D-30167 Hannover, Germany; Oct. 2014; pp. 58-67.

Tabuada, Paulo; "Event-Triggered Real-Time Scheduling of Stabilizing Control Tasks"; IEE Transaction on Automatic Control; vol. 52, No. 9; Sep. 2007; pp. 1680-1685.

Tuomenoksa, David Lee et al.' "Task Preloading Schemes for Reconfigurable Parallel Processing Systems"; IEEE Transactions on Computers; vol. C-33, No. 10; Oct. 1984; pp. 895-905.

* cited by examiner

US 11,314,686 B2

HARDWARE FOR SUPPORTING TIME TRIGGERED LOAD ANTICIPATION IN THE CONTEXT OF A REAL TIME OS

BACKGROUND OF THE INVENTION

Microcontrollers (MCUs) and System(s)-on-a-Chip (SoC) are examples of small computer systems formed on integrated circuits. Each contains one or more central processing units (CPUs), memory for storing executable software instructions, programmable peripherals such as timers, etc. The present disclosure will be described with reference to an MCU and/or a method performed on an MCU, it being understood the present disclosure can find use in many types computer systems and should not be limited to use in MCUs.

MCUs employ a hierarchical memory structure in which copies of instructions and data are stored at different levels. Each of the levels can be supported by memory circuits having different capacities, costs, and access times. Generally speaking, smaller, more expensive and faster memory circuits are located near the CPU and serve as caches. Main memory is also on the MCU and is supported by circuits that are larger, but relatively slow compared to those memory circuits supporting caches. Main memory can be loaded with instructions and data copied from very large memory that is external to the MCU. External memory is supported by less expensive, but slower memory circuits.

Perhaps one of the most limiting features of MCUs is the amount of internal memory. Another issue is related to technologies to create non-volatile memories for the storage of application instructions and data. Combining a non-volatile memory (NVM) with normal logic on a single semiconductor device requires extra development effort, resulting in a time lag between a semiconductor technology that also supports an embedded NVM and one that does not provide this capability. This issue and further developments of the market, e.g. the requirement to support the over-the-air (OTA) update feature (which may result in the need for a larger, sometimes two times larger instruction memory) makes it attractive to search for alternate solutions. One possibility is to use a memory that is external to the semiconductor device, e.g. an external NVM that can be significantly larger than an internal memory. Corresponding devices are often much cheaper than an equivalently sized embedded NVM, but their content must be loaded into the semiconductor device that employs the processor cores that are executing the application. In such a scenario the required instructions and associated constant data can be copied from external memory to main memory before they are executed or utilized by a processor core. Certain scenarios may require a time triggered corresponding copy operation; e.g. when it can be determined in advance that a certain set of instructions is required by an application.

BRIEF DESCRIPTION OF THE DRAWINGS

The present technology may be better understood, and its numerous objects, features, and advantages made apparent to those skilled in the art by referencing the accompanying drawings.

The use of the same reference symbols in different drawings indicates similar or identical items unless otherwise noted. The Figures are not necessarily drawn to scale.

DETAILED DESCRIPTION

MCUs often employ operating systems. As is well understood, operating systems enable multi-tasking in which several different tasks appear to be running concurrently on the same CPU, even though the CPU is only executing instructions of a single task at any given point in time. The appearance of simultaneous task execution is provided by switching between tasks, often before any particular task has completed. A task switch can be carried out without requiring cooperation from the task being stopped and with the intention to resume execution of the stopped task at a later time. During a task switch operation, the state information, or execution context data, for an executing task can be stored for future use. The state information can include, among other things, CPU register contents and the stack. For the purposes of explanation only, a task is presumed to be a unit of execution or a unit of work and includes a set of instructions that can be executed by a CPU.

A particular type of operating system, referred to as a real time operating system (RTOS), is constrained by the amount of time it takes to accept and complete a task. This type of operating system is particularly useful in MCUs that have critical timing requirements, as is often found in embedded systems used in automobiles. The present disclosure will be described with reference to an MCU executing an RTOS, it being understood the present disclosure should not be limited thereto.

As noted above, external memory can store applications that are too big for internal memory of typical MCUs. Before instructions of these oversized applications can be executed, the instructions must be copied from external memory and loaded into internal memory. While external memory is substantially larger than internal memory, it is usually slower to access. The slower access can present challenges to the timing requirements of an RTOS. For example, the scheduled start of a task may be delayed due to external memory access latency. However, this problem can be overcome by preloading internal memory with instructions before the task is scheduled to be started or resumed. Unfortunately, this process of preloading instructions is complicated and places a substantial burden on the CPU. The burden can be explained with reference to FIGS. 1-3.

Figure 1:
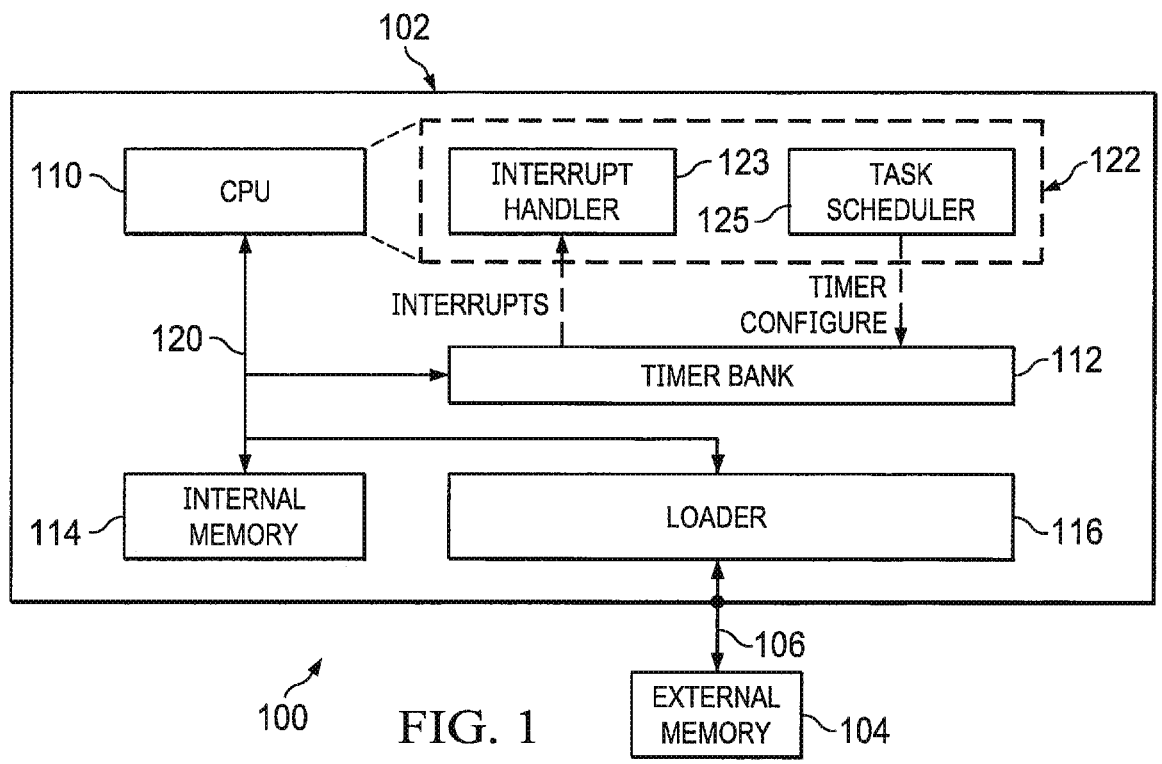
FIG. 1 illustrates relevant components of an example MCU.

FIG. 1 illustrates a system in a package (SiP) 100, which includes an integrated circuit (IC) 102 in data communication with an external, non-volatile memory 104 via communication link 106. IC 102 includes at least one CPU 110 in data communication with internal, random access memory 114 via address and data buses (hereinafter communication bus) 120. CPU 110 directly or indirectly retrieves and executes instructions from internal memory 114.

Internal memory 114 is too small to store all instructions and data of a large application. External memory 104, however, can store an application that exceeds the size of internal memory 114. Instructions and data can be copied from external memory 104 to internal memory 114 before needed as will be more fully described below. CPU 110 can be configured to use virtual memory addressing, which allows for the effective memory space to be extended beyond the physical size of internal memory 114.

CPU 110 is shown executing software, e.g. an application controlled by a real-time operating system (RTOS) 122 that includes several modules (e.g., task scheduler 123, interrupt handler 125, etc.) supporting and controlling the application. Software 122 can schedule tasks for execution. Software 122 can also schedule requests to preload memory 114 with instructions for tasks before the tasks are scheduled to start or resume as will be more fully described below.

MCUs usually include peripherals, which perform specific tasks that could be controlled by software instructions executing on CPUs by accessing a register interface. Peripherals usually implement functionality that is easy to be implemented in hardware or cannot be implemented within software. This frees up CPUs to execute instructions of more important tasks, which in turn enhances MCU real-time performance MCU 102 includes peripherals including one or more timer blocks in timer bank 112. Peripherals, such as a timer block implement their tasks after they are programmed by a CPU. In general software executing on a CPU 110 programs a peripheral by writing control values, time values, etc., to peripheral control registers. These values define the behavior of the peripheral when performing tasks. Programming peripherals is a time consuming and complicated process. Once programmed, however, peripherals work alone to implement their tasks. In other words, programmed peripherals can perform their tasks concurrently while the CPU executes unrelated instructions.

Figure 2:
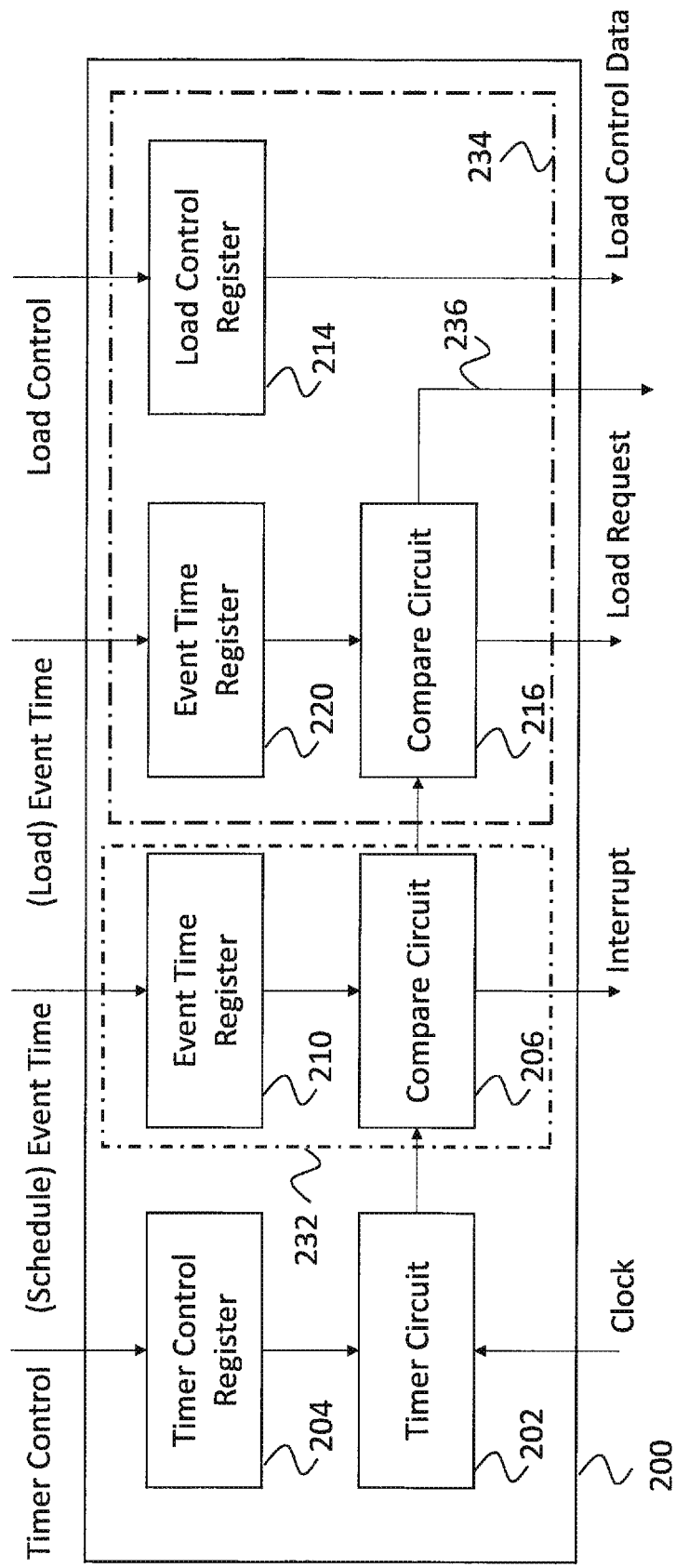
FIG. 2 illustrates an example timer block employed in the MCU of FIG. 1.

Timer blocks in bank 112 are essential to effective operation of software 122. One particular task of relevance for a RTOS that is performed by a timer block is to provide a trigger event for a task switch. FIG. 2 shows an example timer block 200 of bank 112, consisting of a single timer, which is named for the purpose of this discussion a request timer. Another embodiment may implement a timer block that implements multiple request timer instances. Block 200 includes a counter circuit 202, a compare circuit 206, a timer control register 204 and an event time register 210. Software 122 programs block 200 by writing values to registers 204 and 210. For ease of explanation only, the present disclosure will be described with reference to a single timer control register 204.

Counter circuit 202 receives a clock signal. When started, counter 202 increments or decrements a counter value with each pulse or pulses of the clock signal, beginning from an initial value. Timer control register 204 may define whether counter 202 increments or decrements its counter value with the clock signal; a functionality that may be hardcoded or programmable by software. Timer control register 204 can define whether counter 202 stops incrementing or decrementing after the counter reaches a target value, optionally also defining this value or using a predefined value for this purpose. Or timer control register 204 can define whether the counter 202 "wraps around" or continues to increment or decrement after the counter value reaches the target value and is automatically reset to its initial starting value (e.g., zero). The control value written to register 204 can define whether the counter value increments or decrements with each pulse of a clock signal or with each x clock pulses, where x is an integer greater than one. The control value written to timer control register 204 can define other functional aspects of counter operation. The incident of the counter value reaching a target value (programmed or predefined), the wraparound of the counter value or its reset to a starting value can be utilized to generate a timer event that used to trigger a timer request. Timer requests can be made operable to trigger further activities; e.g. an interrupt request or another hardware operation.

Another functional aspect of the timer operation relevant in support by at least one embodiment of this disclosure is the handling of multiple and repeated requests. Multiple request can be supported by a single timer by adding a capability to define one or multiple further (different) target values; e.g. in form of another event time register 210, which must be supported by a further compare circuit 206 that compares the counter value with its target value. The corresponding structure 232 may be replicated to support multiple such requests. When a related functionality is desired, then the above described elements are capable to generate a corresponding event; e.g. every time the counter 202 assumes a value equivalent to the content of at least one event time register. When such a repeated functionality is not beneficial, then software may have to disable the corresponding compare unit before the value of the counter 202 may match again the value of an event timer register. To avoid having to involve software in a related scenario, a match flag can be provided that captures whether a match of the counter value with the content of the event time register has already been identified by a compare circuit. This flag can then be utilized to generate a corresponding event only upon the first time this match has been identified; in any later occasion this event will be suppressed. A similar functionality can be implemented with respect to the counter 202 itself. It may be configured to operate in a single cycle mode or in a recycle mode. In single cycle mode counter 202 increments or decrements its counter value after being started by software. It continues to increment or decrement its counter value until it equals a defined target value. At that point counter 202 stops, and it will remain stopped until restarted by software. When restarted, counter circuit 202 will again increment or decrement its counter value from an initial value. In the recycle mode, counter circuit 202 wraps around. More particularly in this mode, when the counter reaches the target value, counter 202 automatically resets its value to the initial value. Thereafter, counter 202 is capable to increment or decrement the counter value without intervention from software. Event time register 210 stores an event value provided by software 122. Compare circuit 206 compares the counter value with the event value. When the counter value equals the event value, compare circuit 206 generates a corresponding event signal that is either unique to block 200 (e.g. utilized to indicate a counter wraparound) or unique to a particular substructure 232 utilized to generate one of the multiple counter requests. This event signal may be used as request source for further hardware activities; e.g. as an interrupt signal that tells software 122 that counter 202 has expired (i.e., counter value matches the event value) or the event time has been reached.

As noted above, software 122 schedules tasks for execution in accordance with general principles of real-time operating systems. In accordance with at least one embodiment of this disclosure, software 122 may also schedule preload requests in anticipation of the scheduled tasks. Software 122 calculates the times when respective tasks should be started or resumed to ensure their real-time requirements are met. Software 122 can also calculate the time required to preload memory 114 with instructions for respectively scheduled tasks or the portion of a task that is required to quickly start or resume it. This is possible because there is a direct relationship between the load time and the number of bytes to be loaded. The preload times are calculated to ensure that corresponding task instructions are available in internal memory 114 prior to the time the task is scheduled to start or resume. Since there is a direct relationship between this time, and the time required for the preloading to start, a single counter can be used to generate both related events (the event utilized to generate the software interrupt triggering the task scheduler, and the event used to trigger the preload request). Timer blocks such as timer block 200, may be programmed by software 122 to generate two or more independent events, e.g. by a duplicated pair of event time register and compare circuit. A first event is generated by the structure 232 comprising of event time register 210 and compare circuit 206 and utilized to assert an interrupt signal to trigger the task scheduler. A second event is generated by the structure 234 comprising of event time register 220 and compare circuit 216 and utilized to trigger a preload request at calculated task preload times. In addition, a further register element, the Load Control register 214 can be programmed with Load Control data to provide corresponding Load Data (e.g. the address and size of the data to be loaded, or metadata to access the corresponding information) together with the preload request. Such a register may also be included in the set of registers for performing a preload request defined by the structure 234. Any of the two structures 232 and 234 can be replicated multiple times to enable the generation of a larger set of related interrupts and preload requests. Since the basic element of both structures, the event time register {210 resp. 220} with a compare circuit {206 resp. 216}, is equivalent, it is also possible to combine both functions (generating an interrupt and a load request) within a common structure, which is illustrated by extending the structure 234 with the optional interrupt request 236. Such a common structure can also be replicated and made programmable to provide one of both (or both) functions, concurrently or alternatively.

In response to receiving a preload request, loader circuit 116 accesses external memory 104 to read instructions specified by the preload request and its associated load control data. Loader circuit 116 loads the instructions in internal memory 114. As described above, the above extension 232 and 234 of a counter 202 with event generators and a register for the associated load control data is capable to combine the interrupt required for triggering a task scheduler with a related preload request without extra software involvement for the later. Replicating the extensions 232 or 234 (or the common form of them described earlier) may be utilized to permit the generation of multiple such requests, e.g. setting one or multiple alarms to check for or make hardware resources available while preparing one or multiple task switches, while reducing the need for a software interaction just to perform this scheduling.

A benefit of extensions 232 respective 234 of the basic timer block 200 is that they utilize only a single counter element 202 (which is the expensive part to be implemented) to generate the multiple events required for preloading and task scheduling. There is typically a direct time relationship between those events, which can be exploited by a timer block having these extensions. The additional element required for generating a corresponding request, the additional compare circuit 206 respective 216 can be implemented using simple logic (a compare unit requires only XOR gates combined with an AND function from a functionality point of view) compared to an extra timer, which requires at least an adder element. The further registers, the additional event time register 210 respective 220 are only utilized for storing the corresponding data, which is anyway required when using a further timer. Equivalent is true for the load control register 214 which is holding the load control data which is needed when requesting the load operation from the Loader 116. In addition, directly providing the load control data in combination with the load request to the Loader 116 prevents having to involve software e.g. via an additional interrupt. As described above, the scheme of extending a counter 202 with extensions 232 or 234 can be replicated multiple times to also improve this aspect, providing the capability to support multiple scheduling requests that are processed concurrently by a single timer, without the need to involve software further by additional interrupts.

Figure 3:
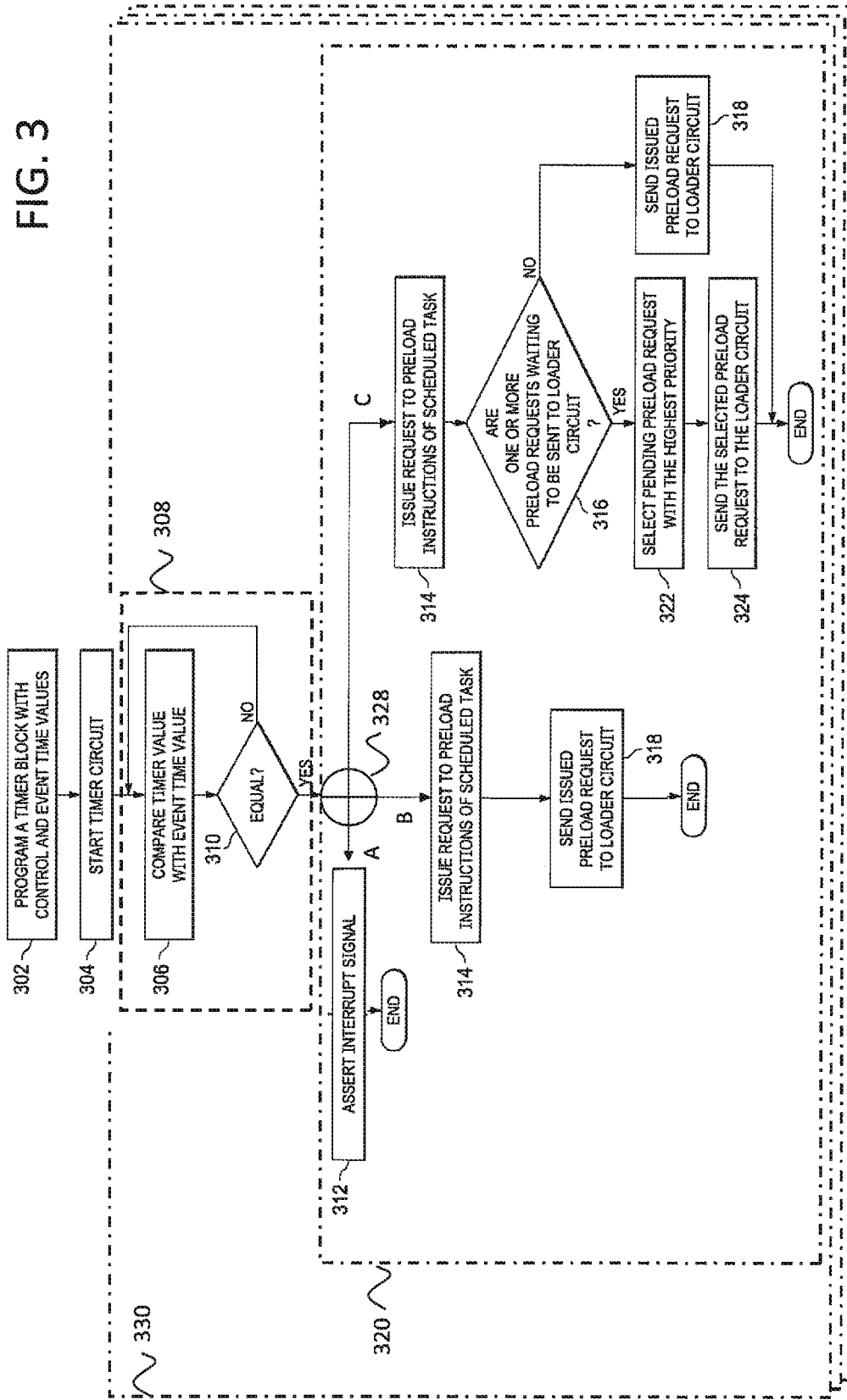
FIG. 3 is a flowchart illustrating operational aspects of the MCU shown in FIG. 1.

FIG. 3 illustrates relevant aspects of the control flow 300 for preloading instructions for a task or portions of a task prior to its scheduled execution. The process of FIG. 3 begins after software 122 calculates a time T1 when a task called TASK should be started or resumed, and therefore its instructions should be preloaded into internal memory 114. A preload request time T2 is calculated by software 122 based on time T1 and the number of bytes to preload, which may further include some extra time to account of the related processing overhead etc. In step 302 software 122 programs timer block 200. More particularly, software 122 writes event time values, which are determined from T1 respective T2, into an event time register 210 respective 220. In addition, load control data may be determined by software 122 and written into a load control register 214. Counter 220 is started in step 304 after control values are written to timer control register 204; in some embodiments these programming steps may occur while counter 220 is running already, in this case the step of starting the timer can be omitted. The two processing steps 302 and 304 are the only ones being performed by software, illustrating the minimum processing requirements imposed on software for a corresponding operation. This neglects the interrupt processing needed for performing the actual task switch by the task scheduler, which has to occur anyway (and is not shown in the flowchart 300).

The following processing step 308 is then performed (by the hardware of the timer block 200) concurrently for every control structure 232 respective 234. Any compare circuit (206 or 216) compares the incrementing counter value with the event value programmed into its associated event time register (210 or 220) as shown in step 306. This comparison is continued until the counter value advances to a value that equals the event value in the event time (register 210 or 220), at which point the compare circuit 206 generates a corresponding event. This comparison or the generation of the corresponding event may be suppressed by a match flag, in case the repeated generation of the related requests is not desired, as has been described earlier.

As a reaction on the generated event, the subsequent processing step 320 is then performed, which may execute one or more of the processing sequences forked from the OR alternative 328 following the above processing step 308. Since there may be a multiplicity of control structures 232 or 234, the corresponding operations described by the steps 308 and 320 may be replicated multiple times concurrently as is depicted by the iteration 330. Software can be instructed to have only a single comparison to report a matching value for every request timer instance at a single point in time. A first alternative A asserts an interrupt signal 312. In response, software 122 may run a corresponding interrupt handler (not shown as indicated earlier). This interrupt handler may i.e. execute the OS task scheduler to perform its operation, which may include a task switch related processing. In another embodiment this interrupt handler may be utilized to issue a request to preload instructions for TASK, which can be time-consuming and CPU intensive process.

A second alternative B (completely performed by hardware) is to issue a request to preload instructions 314 for TASK, which is accompanied by corresponding load control information provided by the load control register 214. This preload request can then be directly sent to the Loader 116 in a subsequent processing step 318, which can then process it without any software involvement. This simple processing scheme is possible when there is only a single entity that may provide such request, or the Loader 116 is capable to process a multiplicity of requests, e.g. by implementing a receive queue (not shown) that processes these request in order or in priority order (e.g. when a corresponding priority value has been provided as part of the load control information). Such a capability is very useful and often required; e.g. in situations when the Loader 116 may receive preload requests from a multiplicity of timers.

In another embodiment there may be a multiplicity of requesters, e.g. processor cores 110, each having a dedicated timer bank 112, where every timer block within this timer bank may be capable to send at least one load request to the Loader 116. Such an embodiment may utilize a timer bank 112 that comprises multiple independently operating timer blocks 200. A third alternative C illustrates the corresponding processing, which consist of the a processing step to issue a request to preload instructions 315 for TASK (equivalent to the processing step 314) that is accompanied by corresponding load control information provided by the load control register 214. A subsequent processing step 316 determines whether there are already requests waiting to be sent, when this is not the case the new preload request can be directly send to the Loader 116 in a step 319, which is equivalent to step 318. When there are pending requests, the next preload request to be serviced is selected by step 322, and the selected preload request is sent to the Loader 116 in step 324. A corresponding complexity must be handled, i.e. when a request timer implemented within the timer block 112 can request more than one load request; it is essential when there are multiple request timers within a timer block, or when there are multiple timer blocks controlled by multiple CPUs and all are accessing a single Loader 116. In such cases it is important that a load request is preserved, even when it cannot be immediately being processed or must wait for an ongoing load operation to be finished. All this has to be performed completely by hardware when an additional involvement of software would be too costly.

The actual complexity of the potential scenarios that may occur in case of alternative C when scheduling the processing of tasks within an operating system is further complicating the situation described above. At any time, an operating system can determine it must schedule a further task switch operation that has an arbitrary priority (higher, lower or same) compared to an already scheduled task. And, although the need for a task switch may be determined later than an earlier scheduled one, it may have to be performed before the earlier scheduled one, and vice-versa. Yet another complication are specific forms of task scheduling. Here a prominent example is a scheme named "priority elevation". This term refers to situations where a task that did not finish execution or did not win arbitration may get assigned a higher priority after some elapsed time. Such a scheme shall ensure that also lower priority tasks can be executed in cases of high processing load when this would otherwise lead to a problematic situation. Another example is utilizing the invocation of an error handler in case a task does not get executed within a certain timeframe; an error fallback scenario. In most situations, this invocation must be inhibited because the observed task has been executed properly. The intent of all above examples is to illustrate the three additional complexities of a task scheduling approach that may have to be taken into account when preloading of instructions has to be supported: i) processing of requests may occur in a different order than the scheduling of these requests (a later scheduled request may have to be processed before an earlier one, and vice versa), ii) the priority of scheduled requests may be arbitrary, and iii) specific scheduling approaches have to be considered. All and any combination of these complexities must be considered when preload requests without software involvement are to be supported, on top of the requirements described in the earlier paragraphs. The further discussion focuses on solving these additional issues; the earlier issues, like the arbitration between multiple requesters (e.g. multiple timer blocks, or multiple processor cores combined with a timer block) are not further considered. This class of issues can already be solved with a timer block 200 in combination with load control information that includes data that can be used for arbitration purposes.

The apparatus of the present disclosure may take its final form in an MCU that contains a peripheral called a programmable preload request circuit that operates in combination with a timer bank 112 implementing one or multiple timer blocks 200. This hardware device, as its name implies, is programmable by software executing on a CPU. Once programmed the above combination operates autonomously to issue and send preload requests for task instructions to a loader circuit 116. The programmable preload request circuit can support preload requests for complex sequences of task scheduling, including but not limited to the scenarios listed earlier. After scheduling a task switch and its associated preload requests, it is able to work autonomously, without requiring further software involvement. Such it is capable to reduce the overhead for processing of preload requests by software to a few registers writes that can be performed together with scheduling the task switch of the corresponding task. In addition, the combination of a timer bank with the programmable preload request circuit can assert software interrupt signals to trigger the start of a task or a switch between tasks.

For purposes of explanation only, the programmable preload request circuit will be described with reference to preloading internal memory with task instructions copied from external memory. However, it should be understood the present technology should not be limited thereto. The programmable preload request circuit of this disclosure can be extended for other purposes such as autonomously programming other MCU peripherals with control values held in internal or external memory.

Figure 4:
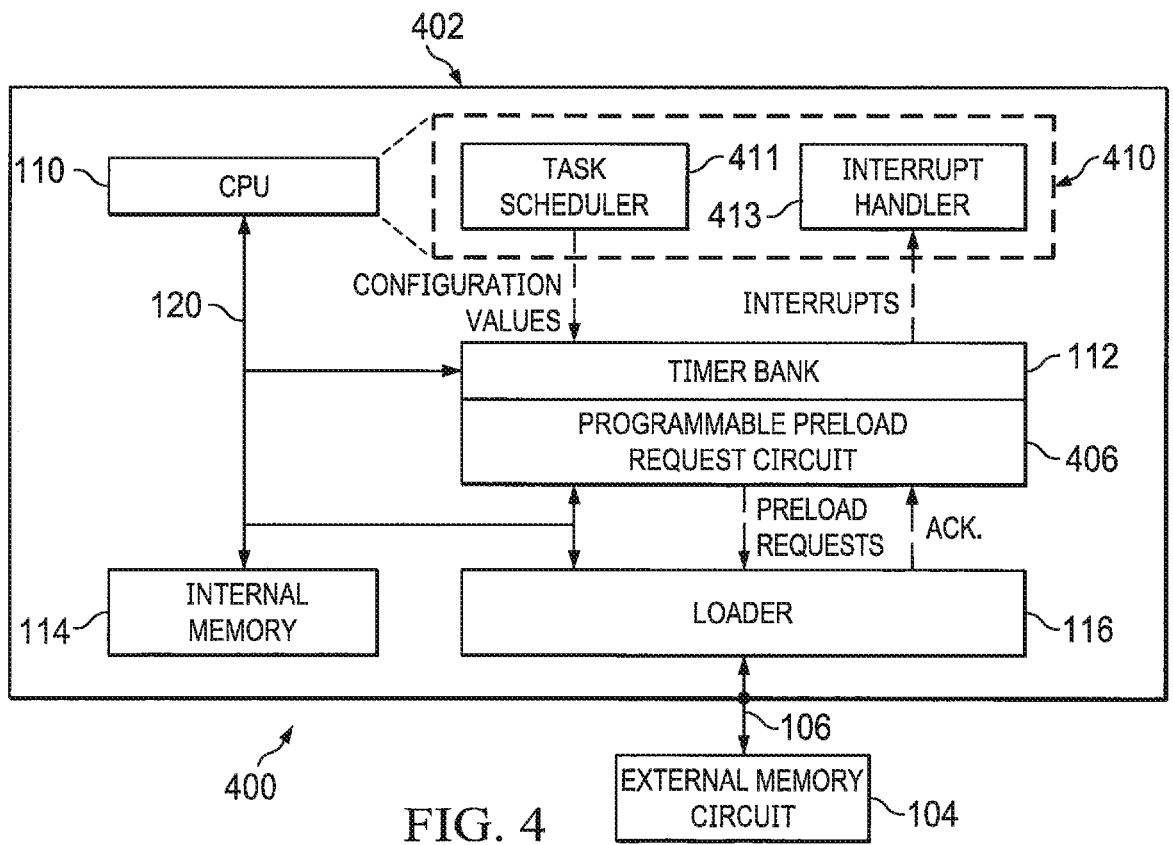
FIG. 4 illustrates relevant components of an example MCU employing one embodiment of the present technology.

FIG. 4 depicts an example SiP 400 shown in block diagram form, which is consistent with embodiments of the present disclosure. SiP 400 includes an MCU 402 in data communication with external memory 104 via communication link 106. MCU 402 and external memory 104 are formed on separate semiconductor dies, it being understood the present disclosure should not be limited thereto.

MCU 402 includes many of the components of MCU 102. For example, MCU 402 includes at least one CPU 110, timer bank 112, internal memory 114 and loader 116. While MCU 402 and 102 contain common components, substantial differences exist. For example, MCU 402 includes a programmable preload request circuit 406. CPU 110 is in data communication with timer bank 112, internal memory 114, programmable preload request circuit 406, and loader 116 via communication bus 120. In an alternative embodiment in which the MCU includes multiple CPUs, there may additional programmable preload request circuits 406, each assigned to and programmable by a respective CPU. For such an embodiment a further arbitration element (not shown) may be utilized to select one of the multiple preload requests provided to the loader 116. Equivalent to MCU 102, MCU 402 connects to an external memory 104 via communication link 106.

CPU 110 is shown executing software 410, e.g. an application controlled by a real-time operating system (RTOS) that includes one or more modules (e.g., task scheduler 411, interrupt handler 413, etc.), similar to that described earlier. A portion of internal memory 114 is dedicated to storing only software 410 and task related information. Software 410 can access and use the task related information for several purposes. For example, software 410 can use the task related information to schedule tasks for execution by CPU 110 on a time-sliced basis, or by using scheduling algorithms that are triggered based on an elapsed time (e.g. setting an alarm). Software 410 can also access and use the task related information to program a programmable preload request circuit 406. Software 410 may perform additional functions.

Programmable preload request circuit 406 is capable to issue requests to preload instructions for certain tasks without any interaction with software. Software 410 can also issue requests to preload instructions for other tasks, either with or without further hardware support. With respect to the latter software 410 may issue preload requests by writing registers of the Loader 116 or in a hardware element interacting with this element (not shown) that forwards the corresponding requests in the same or similar manner described with reference to FIG. 3. In one embodiment preload requests issued by software 410 are not directly sent to loader 116. Rather, these software issued preload requests can be combined with preload requests provided by the programmable preload request circuit 406 and other elements (not shown), as will be more fully described below. For this purpose, programmable preload request circuit 406 may be directly or indirectly (via further elements not shown) be connected to or communicating with the loader 116, as is depicted in FIG. 4.

Software 410 programs programmable preload request circuit 406. Software 410 can write request keys (more fully described below) or preload requests to registers of the timer bank 116 and/or the programmable preload request circuit 406. The distribution of functionality between the timer bank 112 and the programmable preload request circuit 406 is shown for one example embodiment in FIG. 5 below. This distribution permits a clear distribution of work for the sake of clarity. Other embodiments may choose to use differing distributions of function or logic. A preload request directly or indirectly identifies the starting and ending addresses of instructions for a task or portions of a task in external memory. A preload request may include additional information. For example, the preload request may include information that can be used to compare the preload request's priority with respect to the priority of other preload requests pending at the programmable preload request circuit 406. There may be also a multiplicity of such priority criteria, supporting multiple arbitration steps. Alternatively or additionally, preload request priority may be judged based on or combined with information external to the preload requests. Either way, the programmable preload request circuit 406 or a subsequent arbitration element (not shown) can utilize such priority criteria for pending preload requests to identify the one with the highest priority.

Figure 5:
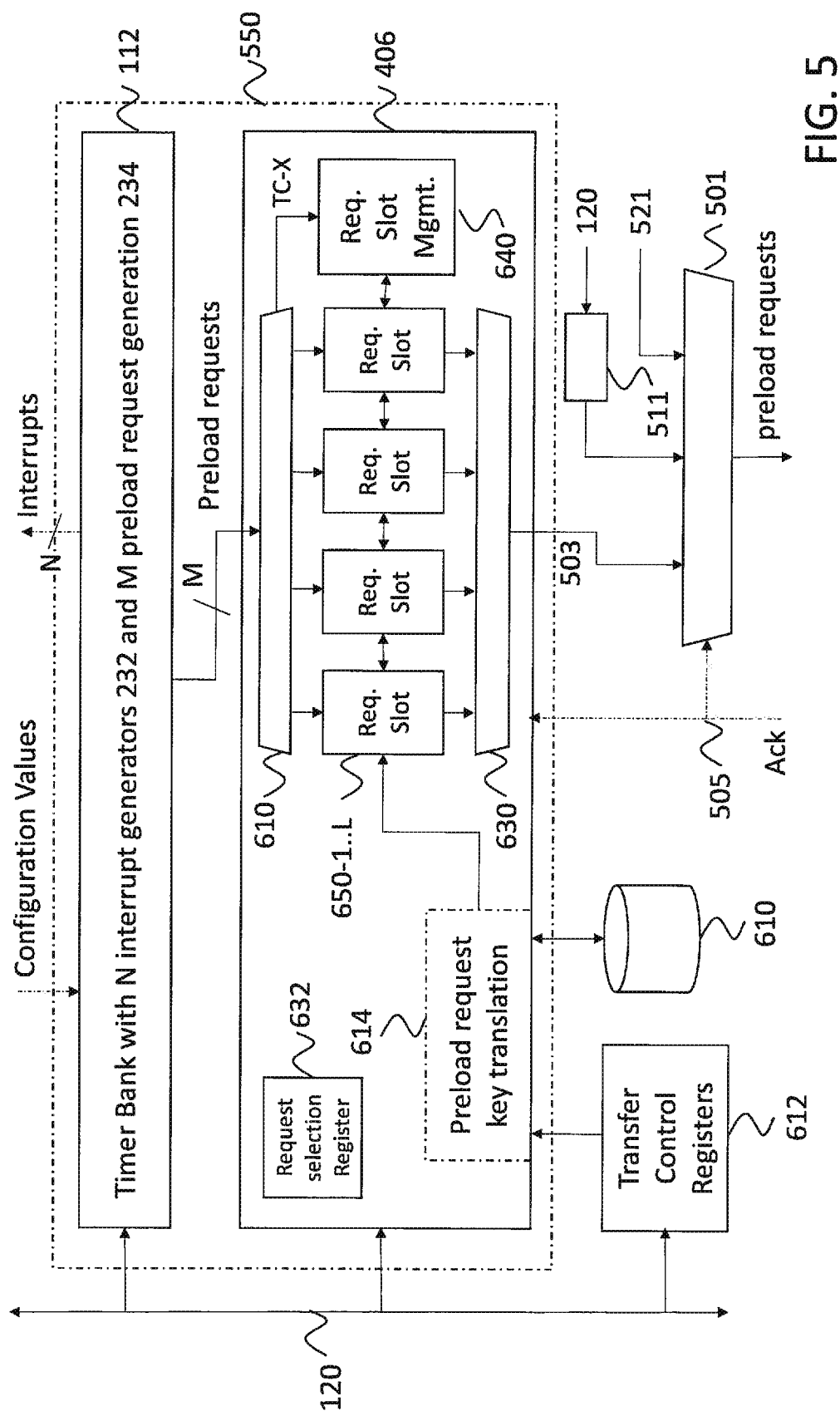
FIG. 5 illustrates relevant components of an example programmable preload request circuit employed in the MCU of FIG. 4 detailing its interacting with its environment.

FIG. 5 is a block diagram illustrating one embodiment of the combination of a timer bank 112 with a programmable preload request circuit 406 as shown within FIG. 4 in combination with other elements it is or may be interacting. Although not essential for the functionality of this combination, these other elements are useful to understand its integration into an IC, its interactions, and to understand variances of its usage.

FIG. 5 illustrates in block diagram form an example embodiment of the above referred combination. It includes a timer bank 112 which may implement one or multiple timer blocks 200 operable to communicate with a programmable preload request circuit 406. For the purposes of explanation one embodiment of the present disclosure will be described with reference to a single timer block 200 implemented within the timer bank 112, it being understood the present technology should not be limited thereto. This timer block 200 is comprising a timer control register 204 and a counter 202. It further comprises N interrupt generation structures 232 comprising of an event time register 210 and a compare unit 206, capable to generate N interrupt requests as described earlier. In addition, it comprises M load request generation structures 234 comprising an event timer register 220, a compare unit 216, and a load control register 214 capable to supply load control information. All registers can be accessed by software via the communication bus 120. These structures are capable to generate up to M preload requests as also described earlier. M and N may be distinct integers greater than one, but M is usually less than N. The counter 202 may be implemented as upwards counting counter or implemented as downwards counting, or may be made programmable to select between one of both modes. In another embodiment a timer block 200 may be formed by N+M generalized structures 234 capable to generate an additional interrupt 236, which can be assigned to one of both purposes (interrupt generation or preload request generation) by programming some control information. Programmable preload request circuit 406 receives preload requests from the timer bank 112; where software assures by its programming of the corresponding control values that only a single preload request is triggered by the timer block 200 at the same time. Processing of multiple requests provided by a multiplicity of timer blocks 200 within the timer bank 112 can be handled by also replicating the corresponding logic within the programmable preload request circuit 406 (not shown). The programmable preload request circuit 406 comprises at least the four following elements that are further described in more detail in relation with embodiments of the present disclosure.

The central element of the programmable preload request circuit 406 is a multiplicity of L request slots 650-1 . . . 650-L, where the number L is usually equal to the amount of preload requests M that may be provided by a timer block implemented within the timer bank. Supporting a multiplicity of timer blocks may be achieved by replicating the corresponding logic within the programmable preload request circuit 406, and utilizing a subsequent arbitration stage (e.g. 501) to select the one being forwarded to the loader 116 Implementing more slots is useless, since the timer block can provide only M preload requests Implementing less slots would require some additional arbitration between the timer bank 112 and the programmable preload request circuit 406; a more expensive implementation than providing an equal number of requests slots, which are simple register elements. The request slots 650-1 ... 650-L are connected to and operated by a request slot management unit 640, which manages the storage of preload request data into the request slots as well as related processing steps as described later. Any request slot is capable to record the information corresponding to a single preload request (either the load control data or derived from it), and may provide further slot management data utilized by the request slot management unit 640; e.g. at least a flag SF that indicates that the corresponding slot contains a preload request.

Another element of the programmable preload request circuit 406 is the slot selector unit 610, which receives the preload requests from the timer bank 112. The slot selector unit 610 selects one of the request slots to be used for a received preload request, for this purpose it is also connected to all request slots. The selection criteria utilized by the slot selector unit 610 may be provided in one embodiment by a control register (not shown) of the programmable preload request circuit 406. In another embodiment this selection criteria may be part of the load control data associated with the received preload request. Upon selection of a request slot (e.g. 650-i) by the slot selector unit 610, this unit forwards corresponding information and the operation to be performed as transfer control data TC-X to the request slot management unit 640.

The request slot management unit 640 executes one or a series of processing steps to update the request slot 650-i with the received preload request, as is specified by corresponding transfer control data TC-X. The transfer control data may also be provided by a control register (not shown) of the programmable preload request circuit 406, or it may be part of the load control data associated with the received preload request. After this update operation, the request slot 650-i contains either no request, an earlier stored preload request, or the received preload request, where the latter two cases are not being distinguished by the further processing.

Yet another element of the programmable preload request circuit 406 is the preload request selection unit 630, which is coupled to all request slots 650-1 ... 650-L and receives the set of preload request recorded within these slots. The request selection unit 630 selects a preload request provided by one of the request slots in accordance with the selection criteria defined in a request selection register 632. This selection criteria specifies the selection priorities for the request slots 650-1 ... 650-L, where the preload request selection unit 630 ignores any request slot that does not contain a preload request. For this purpose, it utilizes the above described flag SF that indicates whether a slot contains a preload request or not. The request selection register 632, as well as any other register of the programmable preload request circuit 406 can be accessed by software via the communication link 120. The preload request selected by request selection unit 630 is then forwarded via a request link 503 for further processing, as is further detailed below. As described earlier, the above logic can be replicated to support a multiplicity of timer blocks within the timer bank 112 providing a multiplicity of preload requests. With continuing reference to FIG. 5, programmable preload request circuit 406 employs a request slot management unit 640, which manages the storage of preload request data into a request slot 650-i, based upon transfer control data TC-X and request slot status information (e.g. the above flag SF that is indicating a full slot), as described above. This transfer control data TC-X governs the processing of the preload request, dependent on the status of the selected target slot as is described below.

Figure 6:
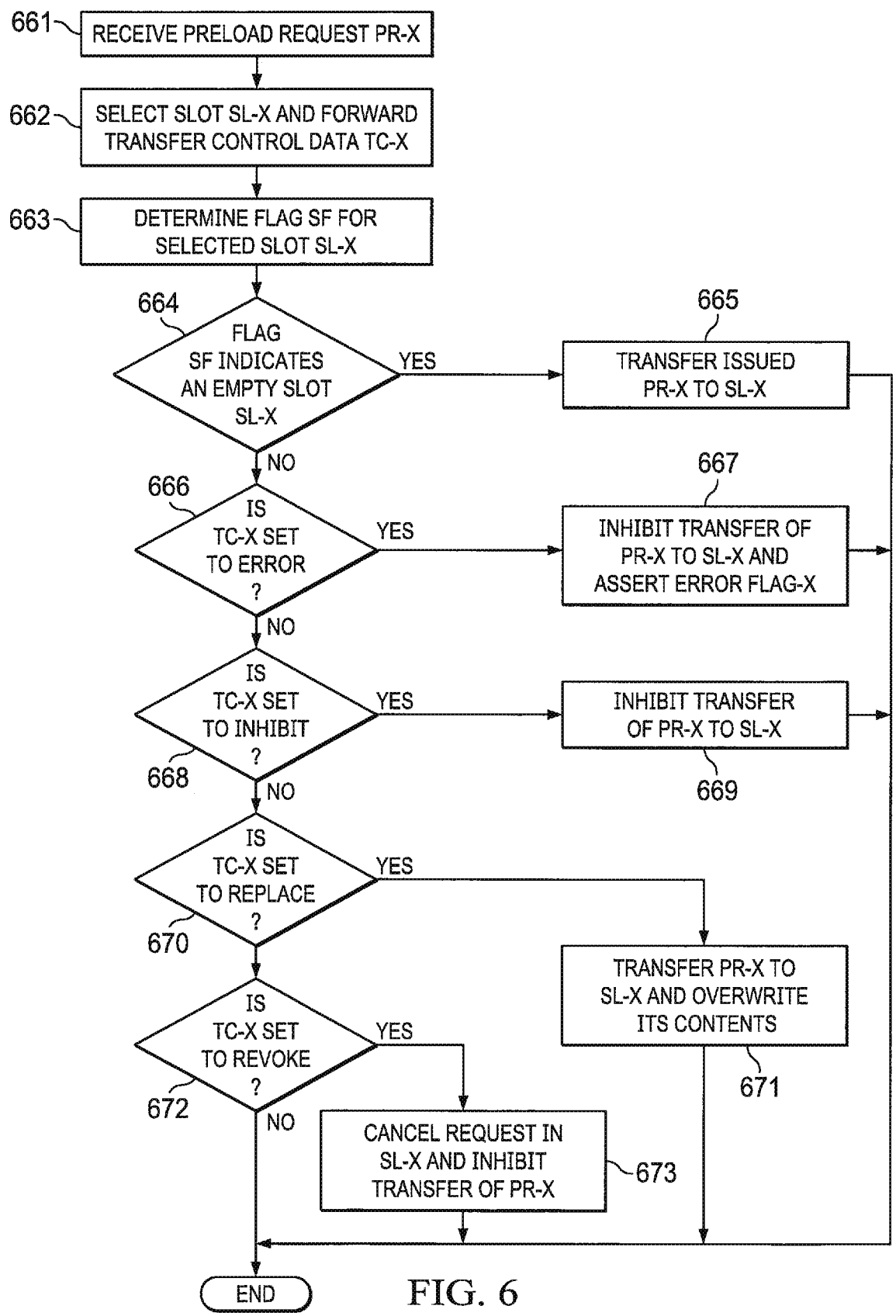
FIG. 6 is a flowchart illustrating relevant aspects of the process implemented by the example preload request circuits of FIG. 5.

FIG. 6 is a flowchart illustrating operational aspects of a request slot management unit 640 processing a preload request PR-X received from the timer bank 112, where this processing is based upon transfer control data TC-X (determined as described above). The process of FIG. 6 starts with step 661, when a preload request PR-X is received by the programmable preload request circuit 406. In the next step 662, the slot selector unit 610 selects a request slot (selecting one of the slots 650-1 ... 650-L) as the target request slot SL-X for this operation, based on the provided selection criteria (as described above). It also forwards the corresponding transfer control data TC-X to the request slot management unit 640, which then determines the value of the flag SF of the selected slot SL-X in step 663. When the flag SF indicates an empty target slot SL-X, the issued preload request PR-X is transferred to the selected slot SL-X. When the flag SF indicates a target slot that already holds another preload request, then the further processing is determined by portions of the transfer control data TC-X, which may select one these cases:

a) "ERROR" (checked in step 666); this selection inhibits the transfer of the received preload request PR-X to the target slot SL-X. Instead, an error flag FLAG-X is asserted. This is illustrated in step 665. The earlier preload request in the target slot SL-X is not affected.

b) "INHIBIT" (checked in step 668); this selection inhibits the transfer of the received preload request PR-X to the target slot SL-X. In this case, the error flag FLAG-X is not asserted. This is illustrated in step 669. The earlier preload request in the target slot SL-X is not affected.

c) "REPLACE" (checked in step 670); this selection performs the transfer of the received preload request PR-X into the target slot SL-X, thus overwriting its earlier content. This is illustrated in step 671.

c) "REVOKE" (checked in step 672); this selection inhibits the transfer of the received preload request PR-X into the target slot SL-X, and removes its earlier content by clearing the flag SR. Thus, the earlier preload request in the target slot SL-X is revoked, without providing a new one. This is illustrated in step 673.

In one embodiment the above functionality may be implemented by a state machine that generates a write-enable signal for the target slot SL-X and the error flag FLAG-X dependent on the transfer control data TC-X and the status flag SF, which is also updating the value of this status flag accordingly. As such this functionality can be completely implemented by hardware, which is capable to perform the above operation concurrently.

With continuing reference to FIG. 5, the load control data provided by one of the M preload request generation structures 234 within the timer bank 112 may comprise data corresponding to a preload request. In another embodiment this load control data may comprise a preload request key. A preload request key can be mapped by a preload request key translation unit 614 to a respective preload request within, for example, preload request table 610, or by selecting one of multiple options specified a register. The related translation may be controlled by information provided in one or multiple transfer control registers 612, which can be programmed via the communication bus 120. The preload request key translation unit 614 may be embedded within the programmable preload request circuit 406 or may be external, e.g. an entity external to the programmable preload request circuit 406 that is shared between or utilized by a multiplicity of such programmable preload request circuit instances or with other elements within the IC 402. In one embodiment, a corresponding translation may occur upon updating the content of a request slot. In another embodiment, a corresponding translation may occur upon request of the request slot management unit 640 after the content of a request slot has been updated. After a corresponding preload request associated with a preload request key has been determined, this preload request will be used for the further processing instead of the preload request key.

In one embodiment the programmable preload request circuit 406 may interact with a first preload request selection (PRS) unit 501, which is configured to select preload requests 503 it receives from a programmable preload request circuit 406 and from other sources. Those other preload requests may be provided, e.g. directly from software via a communication bus 120 written into a preload request register 511 or from other hardware elements (not shown) via a dedicated interface 521. A multiplicity of these requests may be combined with the one or multiple requests provided by the programmable preload request circuit to specify the set of requests for the selection by the PRS 501. The result of this selection is sent to the Loader 116 as the selected preload request 507. Another embodiment may replicate the combination of a timer bank 112 with a programmable preload request circuit 406 to form a combined element 550; multiple of these combined elements may provide a multiplicity of preload requests 503 to a PRS 501. In another embodiment (not shown) there may be a further selection element that combines the multiple requests from a multiplicity of PRS units 501 (e.g. for multiple processor cores 110, where each is capable to generate preload requests via a timer bank) In yet another embodiment the preload request circuit 406 may provide its preload requests 503 directly to a Loader 116.

In one embodiment a new preload request is sent to loader 116 only when an acknowledgment (Ack) signal 505 indicates that loader 116 can accept another preload request. Such an acknowledgement may be utilized by the PRS 501, or the preload request circuit 406, or by both elements, This last feature can accommodate embodiments in which the MCU contains multiple programmable preload request circuits 406 or multiple PRS 501 or further selection elements, each of which is trying to send a preload request to loader 116 at the same time. The acknowledgement 505 can also be utilized by the programmable preload request circuit 406 (and other elements) to support some bookkeeping functionality about the requests it is currently managing. Related functionality may include i.e. removing or invalidating a preload request after it has been processed, or blocking a preload request against removal while it is being processed. A person skilled in the art may enjoy the fact that the described combination of a timer bank 112 with a programmable preload request circuit 406 is capable to not only support preload request for simple scenarios like it has been described in FIG. 3. It is further capable to quickly redefine the processing order and/or relative priority between a new preload request and earlier scheduled requests by changing corresponding selection made within the request selection register 632 which controls the request slot selector unit 630. Such are functionality is essential when a preload request for an arbitrary time shall be scheduled in arbitrary order to an earlier request. Having this capability supported in hardware can reduce any related software overhead significantly. All other elements involved in the scheduling are not affected and may continue their operation. It is further important to support all scheduling scenarios that may arise in an OS scheduler by such an additional preload request without extra software involvement. The usage of the disclosure and its request slots permit the support of corresponding scheduling mechanisms, without impacting the earlier described basic functionality and flexibility required for the reordering. The combination of both capabilities provides support for reordering or a change in the prioritization of preload requests without a subsequent software involvement that can be utilized by an OS scheduler or equivalent functionality to schedule such preload requests.

During the single cycle or recycle mode one or more of the compare circuits 206 may assert their interrupt signals, and one or more of the compare circuits 216 may assert their load request signal as set forth above. The load control data, load times, and event times may remain unchanged within the load control registers 214, and event time registers 210 and 220, respectively, during either mode while they are being used (and also after they are being used when a match flag capability is implemented that suppresses further events to be triggered). The values of these registers not need to be touched again by software, processing is completely autonomous Importantly, software 410 need not to reprogram any registers in usage when it schedules a new task operation with each cycle of the counter value. It only has to grab a free set of registers, program the corresponding time and control values, and adjust the scheduling/priority order in the request selection register to inject the new task operation with the appropriate scheduling and priority order. On the other hand, software 410 can overwrite the contents in any of these registers, still keeping full control over a single request, the counter or all associated requests.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An integrated circuit formed on a substrate, the integrated circuit comprising:
a central processing unit (CPU);
a random access memory (RAM) configured for storing data and CPU executable instructions;
a loader circuit for accessing memory that is external to the integrated circuit, wherein the loader circuit is configured to load the RAM with a copy of instructions and data from the external memory;
a timer bank comprising one or more request timers;
a programmable preload request circuit that is coupled to the timer bank and the loader circuit, the programmable preload request circuit comprising a plurality of request slots connected between a slot selector unit and an arbitration circuit and managed by a request slot management circuit, where each request slot is configured to store a respective preload request under control of the request slot management circuit; and
a communication bus coupled to the CPU, the RAM, the timer bank, the programmable preload request circuit, and the loader circuit;
wherein:
the slot selector unit is coupled to the plurality of request slots and receives preload requests from the timer bank;
each request timer is configured to generate one of the preload requests at a time written to a corresponding register within the timer bank by the CPU;
the programmable preload request circuit is configured to process each of the preload requests received from the timer bank and forward processed preload requests to the loader circuit; and the loader circuit is configured to interpret control data provided by each processed preload request such that the loader circuit loads corresponding instructions or data from the external memory into the RAM.

2. The integrated circuit of claim 1 where each of the preload requests corresponds to a corresponding request trigger and comprises the control data or a key that can be translated into the control data, wherein the control data is needed by the loader circuit to implement preload request operations.

3. The integrated circuit of claim 1 wherein each request timer comprises:
   a counter circuit that provides a counter value, wherein the counter value increments or decrements with time when the counter circuit is started;
   a control register for controlling properties of the counter circuit, including one or more of a) specifying a clock source and an associated prescaler, b) enabling the counter value to increment or decrement, c) specifying a start value, d) specifying a stop value, and e) specifying a behavior when the counter value reaches the stop value; and
   one or more event generation elements, each comprising a) an event time register and b) a compare circuit that can compare the counter value with a specified value in the event time register and generate a match event signal when the counter value reaches or exceeds the specified value in the event time register;
   wherein match event signals are used for interrupting software executing on the CPU or for generating preload requests.

4. The integrated circuit of claim 3 wherein each of the preload requests associates a preload request trigger with related control data provided by a control data register that is associated with the one or more event generation elements.

5. The integrated circuit of claim 4 wherein at least one event generation element is suppressed after generating its event match signal so that the at least one event generation element does not regenerate its event match signal.

6. The integrated circuit of claim 1 wherein the programmable preload request circuit is operable to forward at least one preload request provided by the timer bank to one or more arbitration elements coupled to the loader circuit.

7. The integrated circuit of claim 1 wherein the programmable preload request circuit comprises:
   a request selection register configured to provide selection criteria directly or indirectly, by identifying other sources for corresponding information; and
   a preload request selection unit, coupled to the plurality of request slots, and operable to select one request slot in accordance with the selection criteria provided by the request selection register for forwarding.

8. The integrated circuit of claim 7 wherein the request slot management circuit of the programmable preload request circuit is configured to manage content of a selected request slot upon receiving a received preload request in relation to a context of the selected request slot and related control information;
   wherein:
   the request slot may be full or empty;
   when the request slot is full, the request slot may be utilized by an ongoing load operation;
   earlier content of a full request slot may be removed or invalidated; and
   writing the received preload request into the selected request slot may be permitted or rejected.

9. The integrated circuit of claim 7 wherein the programmable preload request circuit is operable to remove or invalidate content of a request slot upon performing a corresponding preload request by the loader circuit.

10. The integrated circuit of claim 1 wherein the programmable preload request circuit is operable to translate the control data associated with a corresponding preload request trigger, or portions thereof, into information required by the loader circuit to implement the preload request.

11. A method implemented on an integrated circuit, the method comprising:
    a first timer generating a first preload request comprising first information, wherein the first information directly or indirectly identifies first control data required for performing a first preload operation;
    first processing of the first preload request in accordance with a control specification that is part of the first information or is specified in a first control register, wherein the first processing comprises processing the first preload request at a slot selector which selects a first storage element from one or more storage elements for storing the first preload request in the first storage element when the first storage element is not occupied or by implementing specific processing when the first storage element is occupied; and
    second processing of one or more preload requests in the one or more storage elements, respectively, wherein the second processing comprises using an arbitration stage to select one of the preload requests stored in the one or more storage elements for subsequent processing by a loader circuit, wherein the selected one of the preload requests is removed from its storage element after it is subsequently processed by the loader circuit and wherein the subsequent processing comprises loading instructions from external memory to RAM,
    wherein a timer bank comprises one or more request timers including the first timer, and
    wherein a programmable preload request circuit is coupled to the timer bank and loader circuit, the programmable preload request circuit further comprising the one or more storage elements connected between the slot selector and the arbitration stage and managed by a request slot management circuit, where each storage element stores a respective preload request under control of the request slot management circuit.

12. The method of claim of claim 11 wherein the specific processing comprises one or more of:
    a) rejecting the first preload request when the first storage element is utilized by the second processing,
    b) rejecting the first preload request when the first storage element is occupied by an earlier preload request,
    c) generating an error indication when the first storage element is occupied by the earlier preload request,
    d) replacing the earlier preload request in the first storage element with the first preload request, and
    e) revoking the earlier preload request within the first storage element without storing the first preload request; and
    wherein a rejection of the first preload request comprises inhibiting its storage into the first storage element and revoking the earlier preload request comprises removing the earlier preload request from the first storage element.

13. The method of claim of claim 11 wherein the first processing comprises:
    translating the first information into second information that identifies the first control data; and selecting the first storage element to receive the second information or portions thereof when the first storage element is not occupied, and implementing the specific processing when the first storage element is occupied.

14. The method of claim 13 wherein the specific processing comprises one or more of:
   a) rejecting the first preload request when the first storage element is utilized by the second processing,
   b) generating an error indication when the first storage element is occupied by an earlier preload request,
   c) replacing the earlier preload request in the first storage element with the first preload request, and
   d) revoking the earlier preload request within the first storage element without storing the first preload request; and
   wherein a rejection of the first preload request comprises inhibiting its storage into the first storage element and revoking the earlier preload request comprises removing the earlier preload request from the first storage element.

15. The method of claim 11 wherein the second processing comprises:
   determining a set of storage elements containing valid preload requests;
   selecting a storage element that contains a valid preload request utilizing priority information provided by the control specification, which is provided from a content of a second control register and preload request information stored within the set of storage elements containing valid preload requests; and
   forwarding the selected one of the preload requests for the subsequent processing.

16. The method of claim 11 further comprising:
   writing an event time value in an event time register;
   writing control data into a control register;
   starting a counter circuit in accordance with the control data in the control register, wherein the counter circuit increments or decrements a counter value with time when started;
   wherein the counter circuit continues incrementing or decrementing, or restarts the incrementing or decrementing at a start value as specified by the control specification;
   in response to detecting a stop value provided by the control data in the control register, either disabling the counter circuit or restarting the counter circuit at the start value, based on the control data in the control register;
   a compare circuit comparing the counter value with the event time value in the event time register;
   wherein a match event signal is generated in response to detecting a match between the counter value and the event time value;
   in response to generating the match event signal, performing one or more of:
   setting a match flag;
   suppressing a regeneration of the match event signal when the match flag is set,
   generating an interrupt request,
   generating the first preload request.

17. The method of claim 11, wherein the subsequent processing comprises:
   forwarding the selected preload request to the loader circuit operable to perform a preload operation;
   interpretation of control data provided by the selected preload request to identify control information for implementing the selected preload request, wherein the interpreted control information may directly or indirectly specify:
   a first starting address in the external memory, and
   a number of bytes to be loaded from the external memory; and
   loading instructions and constant data that can be found in external memory into the RAM.

18. An apparatus comprising:
   a microcontroller; and
   a nonvolatile memory circuit external to the microcontroller and in data communication with microcontroller;
   the microcontroller comprising:
   a central processing unit (CPU);
   a random access memory (RAM) configured for storing data and CPU executable instructions;
   a loader circuit for accessing the nonvolatile memory circuit, wherein the loader circuit is configured to load the RAM with a copy of instructions and data from the nonvolatile memory circuit;
   a timer bank comprising one or more request timers;
   a programmable preload request circuit that is coupled to the timer bank and the loader circuit, the programmable preload request circuit comprising a plurality of request slots connected between a slot selector unit and an arbitration circuit and managed by a request slot management unit, where each request slot is configured to store a respective preload request; and
   a communication bus coupled to the CPU, the RAM, the timer bank, the programmable preload request circuit, and the loader circuit;
   wherein:
   the slot selector unit is coupled to the plurality of request slots and receives preload requests from the timer bank;
   each request timer is configured to generate one of the preload requests at a time written to a corresponding register within the timer bank by the CPU;
   the programmable preload request circuit is configured to process each of the preload requests received from the timer bank and forward processed preload requests to the loader circuit; and
   the loader circuit is configured to interpret control data provided by each processed preload request such that the loader circuit loads corresponding instructions or data from the nonvolatile memory circuit into the RAM.

19. The apparatus circuit of claim 18 wherein the programmable preload request circuit comprises:
   a request selection register configured to provide selection criteria directly or indirectly, by identifying other sources for corresponding information; and
   a preload request selection unit, coupled to the request slots, and operable to select one request slot in accordance with the selection criteria provided by the request selection register for forwarding.

20. The apparatus circuit of claim 18 wherein each request timer comprises:
   a counter circuit that provides a counter value, wherein the counter value increments or decrements with time when the counter circuit is started;
   a control register for controlling properties of the counter circuit, including one or more of a) specifying a clock source and an associated prescaler, b) enabling the counter value to increment or decrement, c) specifying a start value, d) specifying a stop value, and e) specifying a behavior when the counter value reaches the stop value; and one or more event generation elements, each comprising a) an event time register and b) a compare circuit that can compare the counter value with a specified value in the event time register and generate a match event signal when the counter value reaches or exceeds the specified value in the event time register;

wherein match event signals are used for interrupting software executing on the CPU or for generating preload requests.

* * * * *